United States Patent
Dristy et al.

(10) Patent No.: US 6,926,988 B2
(45) Date of Patent: Aug. 9, 2005

(54) APPARATUS AND METHOD FOR MAINTAINING COMPRESSION OF THE ACTIVE AREA IN AN ELECTROCHEMICAL CELL

(75) Inventors: Mark E. Dristy, Kutztown, PA (US); Thomas Skoczylas, Meriden, CT (US); Greg A. Hanlon, East Hampton, CT (US); Jason K. Shiepe, Middletown, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 499 days.

(21) Appl. No.: 09/965,675

(22) Filed: Sep. 27, 2001

(65) Prior Publication Data

US 2002/0071984 A1 Jun. 13, 2002

Related U.S. Application Data

(60) Provisional application No. 60/235,944, filed on Sep. 27, 2000, and provisional application No. 60/235,975, filed on Sep. 28, 2000.

(51) Int. Cl.⁷ .............................................. H01M 10/14
(52) U.S. Cl. ...................................... 429/37; 429/66
(58) Field of Search ............................. 429/37, 66, 38

(56) References Cited

U.S. PATENT DOCUMENTS

| | | | |
|---|---|---|---|
| 3,656,027 A | 4/1972 | Isley | 317/230 |
| 4,011,360 A | 3/1977 | Walsh | 428/402 |
| 4,225,654 A | 9/1980 | Tajima et al. | 429/34 |
| 4,317,864 A | 3/1982 | Strasser | 429/36 |
| 4,488,203 A | 12/1984 | Muranaka et al. | 361/433 |
| 4,732,660 A | 3/1988 | Plowman et al. | 204/265 |
| 4,745,301 A | 5/1988 | Michalchik | 307/119 |
| 4,844,922 A | 7/1989 | Uemura et al. | 429/34 |
| 4,902,427 A | 2/1990 | Szczepanik | |
| 4,912,286 A | 3/1990 | Clarke | 174/110 A |
| 4,936,970 A | 6/1990 | Weinberg et al. | |
| 4,971,666 A | 11/1990 | Weinberg et al. | |
| 5,009,968 A | 4/1991 | Guthrie et al. | 429/26 |

(Continued)

FOREIGN PATENT DOCUMENTS

| | | | | |
|---|---|---|---|---|
| DE | 200 08 539 | | 8/2000 | |
| GB | 966407 | | 8/1964 | |
| WO | WO 98/23794 | | 6/1998 | |
| WO | WO 98/40537 | | 9/1998 | |
| WO | WO 98/57384 | | 12/1998 | |
| WO | WO 99/27599 | | 6/1999 | |
| WO | WO 00/39362 | * | 7/2000 | H01M/8/02 |
| WO | WO 02/50339 A1 | | 6/2002 | |

OTHER PUBLICATIONS

English Translation of JP 10162842 *Abstract Only* (Japan), 1 page.

(Continued)

*Primary Examiner*—Mark Ruthkosky
(74) *Attorney, Agent, or Firm*—Cantor Colburn LLP (57) ABSTRACT

An electrochemical cell includes a first electrode, a second electrode, a proton exchange membrane disposed between and in intimate contact with the electrodes, and a pressure pad disposed in electrical communication with the first electrode. The pressure pad is compatible with the cell environment and is configured to support the electrodes and the membrane. The pressure pad includes an electrically conductive member and a compression member disposed at the electrically conductive member. A method of maintaining compression within the cell includes disposing the electrically conductive member and the compression member at the first electrode, applying a load at the cell to compress the cell components, and maintaining electrical communication through the electrically conductive member.

38 Claims, 7 Drawing Sheets

U.S. PATENT DOCUMENTS

| | | | | |
|---|---|---|---|---|
| 5,082,596 | A | | 1/1992 | Fukuda et al. ............... 252/511 |
| 5,126,218 | A | | 6/1992 | Clarke |
| 5,173,215 | A | | 12/1992 | Clarke |
| 5,281,496 | A | | 1/1994 | Clarke ........................ 429/218 |
| 5,296,570 | A | | 3/1994 | Earls et al. .................. 525/481 |
| 5,324,565 | A | * | 6/1994 | Leonida et al. ............. 428/131 |
| 5,366,823 | A | * | 11/1994 | Leonida et al. ............... 429/34 |
| 5,466,354 | A | | 11/1995 | Leonida et al. ............. 304/252 |
| 5,472,801 | A | | 12/1995 | Mattejat et al. ............... 429/39 |
| 5,498,644 | A | | 3/1996 | Reo ........................... 523/218 |
| 5,547,777 | A | | 8/1996 | Richards ...................... 429/32 |
| 5,580,672 | A | | 12/1996 | Zagala, III et al. ......... 204/265 |
| 5,585,038 | A | | 12/1996 | Kirmanen et al. .......... 252/500 |
| 5,656,690 | A | | 8/1997 | Pradl et al. .................. 524/847 |
| 5,686,200 | A | * | 11/1997 | Barton et al. .................. 429/37 |
| 5,824,199 | A | | 10/1998 | Simmons et al. ........... 204/265 |
| 5,942,350 | A | | 8/1999 | Roy et al. ..................... 429/38 |
| 6,096,450 | A | | 8/2000 | Walsh ......................... 429/34 |
| 6,171,719 | B1 | | 1/2001 | Roy et al. ..................... 429/39 |
| 6,365,032 | B1 | * | 4/2002 | Shiepe et al. ............... 205/338 |
| 6,585,869 | B2 | * | 7/2003 | Shiepe et al. ............... 204/252 |
| 2002/0022173 | A1 | | 2/2002 | Molter et al. .................. 429/37 |

OTHER PUBLICATIONS

English Translation of JP 02160371 *Abstract Only* (Japan), 1 page.

English Translation of JP 05166523 *Abstract Only* (Japan), 1 page.

English Translation of JP 58164170 *Abstract Only* (Japan), 1 page.

English Translation of JP 05101836 *Abstract Only* (Japan), 1 page.

"Conductive Ceramic Technology", The Ebonix Company, http://www.netcontex.com/atraverda/index.htm; Jan. 15, 2002, 11 pages.

T.G. Coker, et al.—"Industrial and Government Applications of SPE Fuel Cell and Electrolyzers", The Case western Symposium, May 17–19, 1982, Cleveland, Ohio, 23 pages.

Clark et al., "Prolonged Service Life, Integral Economics", ISSN: 0039–4912; Sulzer Tech. Rev. 77, (2), pp 30–33, 1995, Abstract Only, 1 page.

Graves et al., "The Electrochemistry of Magneli Phase Titanium Oxide Ceramic Electrodes. I. The Deposition and Properties of Metal Coatings", ISSN: 0021–891X, Journal of Applied Electrochemistry, 21, (10), Oct. 1991, pp 848–857, Abstract Only, 1 page.

Harnsberger et al., "A New Fluoride Resistant Ceramic Electrode for Electrochemical Effluent Treatment Processes", ISSN: 0360–3164; plating and Surface Finishing, 77, (7), Jul. 1990, pp 40–42, Abstract Only, 1 page.

Clarke et al., "Temperature Dependence of the X–Ray and Neutron Diffraction from a Metallic Glass", ISSN: 0038–1098, Solid State Commun., 36, (9), Dec. 1980, pp 751–755, Abstract Only, 1 page.

Clark et al., "Remetalling by High–Velocity Oxy–Fuel Spraying Gives Longevity and Rentability to Mechanical Parts", ISSN: 0040–1250, Technique Moderne, vol. 87, No. 3–4, 1995, pp 31–33, Abstract Only, 1 page.

Clark et al., "Search for Sup 3 H, Sub 3 He, and Sub 4 He in D Sub 2 –loaded Titanium", ISSN: 0748–1896, Fusion Technology (United States), vol. 21, No. 2, pp 170–175, Abstract Only, 1 page.

Zhang et al., "Nitride Film Deposition by Femtosecond and Nanosecond Laser Ablation in Low–Pressure Nitrogen Discharge Gas", ISSN: 0169–4332, Applied Surface Science, v 154, 2000, pp 165–171, Abstract Only, 1 page.

Smith et al., "Electrodes Based on Magneli Phase Titanium Oxides: The Properties and Applications of Ebonex Materials", ISSN: 0021–891X, Journal of Applied Electrochemistry, v 28, n 10, Oct. 1998, pp 1021–1033, Abstract Only, 1 page.

Snadden et al., "Two–photon Spectroscopy with a Modelocked Laser in Doughnut Mode Laser–cooled Rb", Coden: 002097, Conference on Quantum Electronics and Laser Science (QELS)—Technical Digest Series, v9, 1996, pp 16–17, Abstract Only, 1 page.

Graves et al., "Electrochemistry of Magneli Phase Titanium Oxide Ceramic Electrodes. Part II. Ozone Generation at Ebonex and Ebonex/lead Dioxide Anodes", ISSN: 0021–891X, Journal of Applied Electrochemistry, v 22, n 3, Mar. 1992, pp 200–203, Abstract Only, 1 page.

Clarke et al., " Search for SUP3H, SUP3He, and SUP4He in DSUB2–loaded Titanium", ISSN: 0748–1896, Fusion Technology, v 21, n 2, pt 1, Mar. 1992, pp 170–175, Abstract Only, 1 page.

European Patent, Publication No. 00443230/EP A1, Publication Date: Aug. 28, 1991, Abstract Only, 1 page.

European Patent, Publication No. 00443229/EP A1, Publication Date: Aug. 28, 1991, Abstract Only, 1 page.

European Patent, Publication No. 00369732/EP A1, Publication Date: May 23, 1990, Abstract Only, 1 page.

European Patent, Publication No. 00360942/EP A1, Publication Date: Apr. 4, 1990, Abstract Only, 1 page.

European Patent, Publication No. 00332337/EP A1, Publication Date: Sep. 13, 1989, Abstract Only, 1 page.

European Patent, Publication No. 00572559/EP B1, Publication Date: May 21, 1997, Exemplary Claims, 1 page.

European Patent, Publication No. 00369732/EP B1, Publication Date: Aug. 16, 1995, Exemplary Claims, 1 page.

European Patent, Publication No. 00360942/EP B1, Publication Date: May 23, 1990, Exemplary Claims, 1 page.

International Patent, Publication No. 00149613 WO, Publication Date: Jul. 12, 2001, Abstract Only, 1 page.

* cited by examiner

APPARATUS AND METHOD FOR MAINTAINING COMPRESSION OF THE ACTIVE AREA IN AN ELECTROCHEMICAL CELL

CROSS REFERENCE TO RELATED APPLICATIONS

This application claims the benefits of U.S. Provisional Patent Application Ser. No. 60/235,944 filed Sep. 27, 2000, and U.S. Provisional Patent Application Ser. No. 60/235,975 filed Sep. 28, 2000, the entire contents of both applications being incorporated herein by reference.

BACKGROUND

This disclosure relates to electrochemical cells, and, more particularly, to an apparatus for maintaining compression within the active area of an electrochemical cell.

Figure 1:
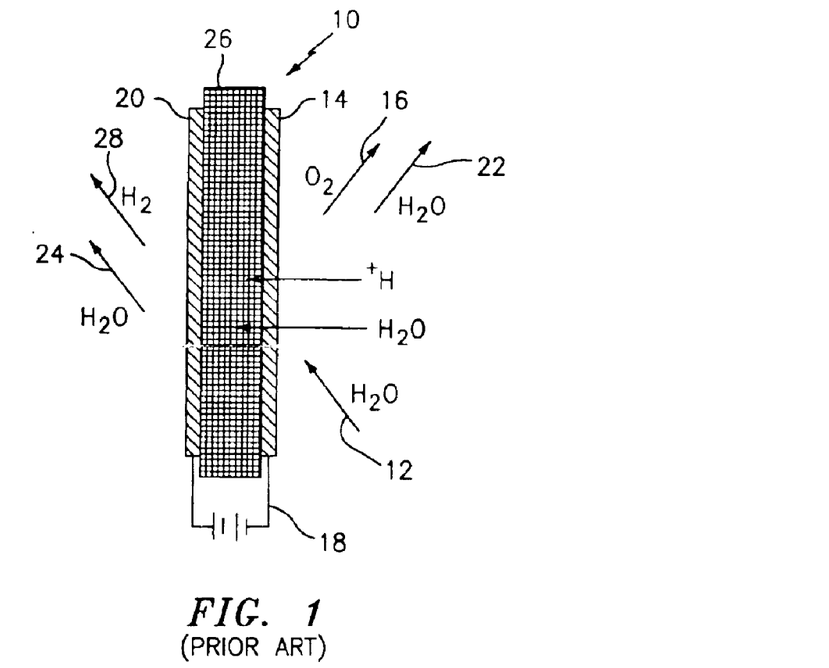
FIG. 1 is a schematic representation of a conventional anode feed electrolysis cell.

Electrochemical cells are energy conversion devices that are usually classified as either electrolysis cells or fuel cells. Proton exchange membrane electrolysis cells can function as hydrogen generators by electrolytically decomposing water to produce hydrogen and oxygen gases. Referring to FIG. 1, a section of an anode feed electrolysis cell of the related art is shown at 10 and is hereinafter referred to as "cell 10." Reactant water 12 is fed to cell 10 at an oxygen electrode (e.g., an anode) 14 where a chemical reaction occurs to form oxygen gas 16, electrons, and hydrogen ions (protons). The chemical reaction is facilitated by the positive terminal of a power source 18 connected to anode 14 and a negative terminal of power source 18 connected to a hydrogen electrode (e.g., a cathode) 20. Oxygen gas 16 and a first portion 22 of the water are discharged from cell 10, while the protons and a second portion 24 of the water migrate across a proton exchange membrane 26 to cathode 20. At cathode 20, hydrogen gas 28 is formed and is removed for use as a fuel or a process gas. Second portion 24 of water, which is entrained with hydrogen gas, is also removed from cathode 20.

Another type of water electrolysis cell that utilizes the same configuration as is shown in FIG. 1 is a cathode feed cell. In the cathode feed cell, process water is fed on the side of the hydrogen electrode. A portion of the water migrates from the cathode across the membrane to the anode. A power source connected across the anode and the cathode facilitates a chemical reaction that generates hydrogen ions and oxygen gas. Excess process water exits the cell at the cathode side without passing through the membrane.

A typical fuel cell also utilizes the same general configuration as is shown in FIG. 1. Hydrogen gas is introduced to the hydrogen electrode (the anode in the fuel cell), while oxygen, or an oxygen-containing gas such as air, is introduced to the oxygen electrode (the cathode in the fuel cell). The hydrogen gas for fuel cell operation can originate from a pure hydrogen source, a hydrocarbon, methanol, or any other source that supplies hydrogen at a purity level suitable for fuel cell operation. Hydrogen gas electrochemically reacts at the anode to produce protons and electrons, the electrons flow from the anode through an electrically connected external load, and the protons migrate through the membrane to the cathode. At the cathode, the protons and electrons react with oxygen to form water.

Conventional electrochemical cell systems generally include one or more individual cells arranged in a stack, with the working fluids directed through the cells via input and output conduits formed within the stack structure. The cells within the stack are sequentially arranged, each including a membrane electrode assembly (hereinafter "MEA") defined by a cathode, a proton exchange membrane, and an anode. Each cell typically further comprises a first flow field in fluid communication with the cathode and a second flow field in fluid communication with the anode. The MEA may be supported on either or both sides by flow field support members such as screen packs or bipolar plates disposed within the flow fields, and which may be configured to facilitate membrane hydration and/or fluid movement to and from the MEA.

Figure 2:
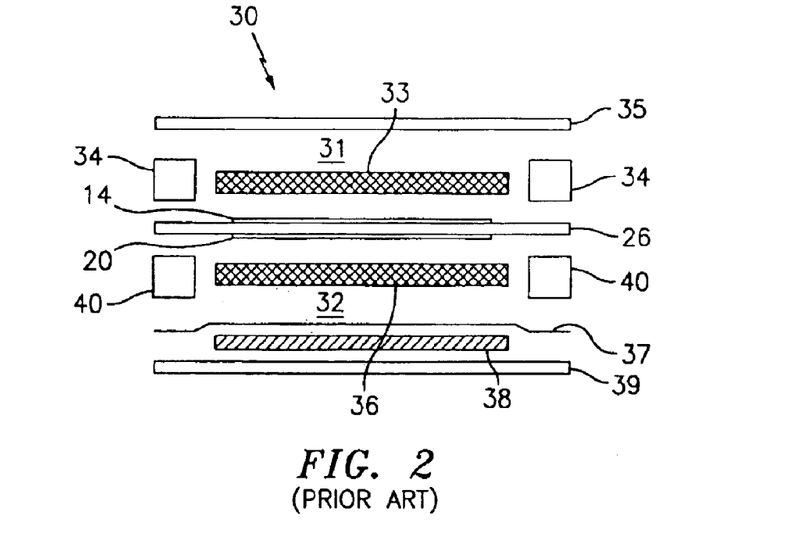
FIG. 2 is a cross sectional schematic representation of a conventional electrochemical cell system showing the spatial relationship of the cell components.

Referring to FIG. 2, a conventional electrochemical cell system suitable for operation as an anode feed electrolysis cell, a cathode feed electrolysis cell, or a fuel cell is shown at 30. Cell system 30 includes the MEA defined by anode 14, cathode 20, and proton exchange membrane 26. Regions proximate to and bounded on at least one side by anode 14 and cathode 20 respectively define flow fields 31, 32. A flow field support member 33 is disposed adjacent to anode 14 and is retained within flow field 31 by a frame 34 and a cell separator plate 35. A flow field support member 36 is disposed adjacent to cathode 20 and is retained within flow field 32 by a frame 40 and a pressure pad separator plate 37. A pressure pad 38 is disposed between pressure pad separator plate 37 and a cell separator plate 39. The cell components, particularly frames 34, 40 and cell separator plates 35, 39, are formed with the suitable manifolds or other conduits to facilitate fluid communication through cell system 30.

A pressure differential often exists within the cell system and particularly across the cell. Such a pressure differential may cause variations in the pressure distribution over the surface area of the MEA. In order to compensate for the pressure differential while maintaining intimate contact between the various cell components under a variety of operational conditions and over long time periods, compression is applied to the cell components via pressure pad 38. However, because pressure pads 38 are generally fabricated from materials incompatible with system fluids and/or the material from which the cell membrane is fabricated, pressure pads 38 are oftentimes separated from the active area by pressure pad separator plate 37 or enclosed within protective casings (not shown).

While existing pressure pads are suitable for their intended purposes, there still remains a need for improvements, particularly regarding the compression of the components in the electrolysis cell and support of the MEA, particularly at high pressures. Therefore, a need exists for a pressure pad that is compatible with the cell environment and that provides uniform compression of the cell components and support of the MEA, thereby allowing for the optimum performance of the electrolysis cell.

SUMMARY

The above-described drawbacks and disadvantages are alleviated by an electrochemical cell comprising a first electrode, a second electrode, a proton exchange membrane disposed between and in intimate contact with the electrodes, and a pressure pad disposed in electrical communication with the first electrode. The pressure pad is compatible with the cell environment and is configured to support the electrodes and the membrane. The pressure pad includes an electrically conductive member and a compression member disposed at the electrically conductive member. A method of maintaining compression within the cell includes disposing the electrically conductive member and the compression member at the first electrode, applying a load to compress the cell components, and maintaining electrical communication through the electrically conductive member.

The above discussed and other features and advantages will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike in the several FIGURES.

DETAILED DESCRIPTION

Disclosed herein is a novel apparatus and methods for maintaining the compression of the active area in an electrochemical cell. The active area generally refers to the electrically associated electrodes and the space between two or more electrically associated electrodes of the cell. A compression device, e.g., a pressure pad as is described below, is disposed at the cell proximate to one of the electrodes. Other compression devices may further be disposed proximate to the other electrodes. The pressure pad, which comprises an electrically conductive material and a resilient elastomeric material selected for its compatibility with the cell environment, is typically disposed at a flow field adjacent to the electrode where it is exposed to the system fluids.

Although the disclosure below is described in relation to a proton exchange membrane electrochemical cell employing hydrogen, oxygen, and water, other types of electrochemical cells and/or electrolytes may be used, including, but not limited to, phosphoric acid and the like. Various reactants can also be used, including, but not limited to, hydrogen, bromine, oxygen, air, chlorine, and iodine. Upon the application of different reactants and/or different electrolytes, the flows and reactions change accordingly, as is commonly understood in relation to that particular type of electrochemical cell. Furthermore, while the discussion below is directed to an anode feed electrolysis cell, it should be understood by those of skill in the art that cathode feed electrolysis cells, fuel cells, and regenerative fuel cells are also within the scope of the embodiments disclosed.

Figure 3:
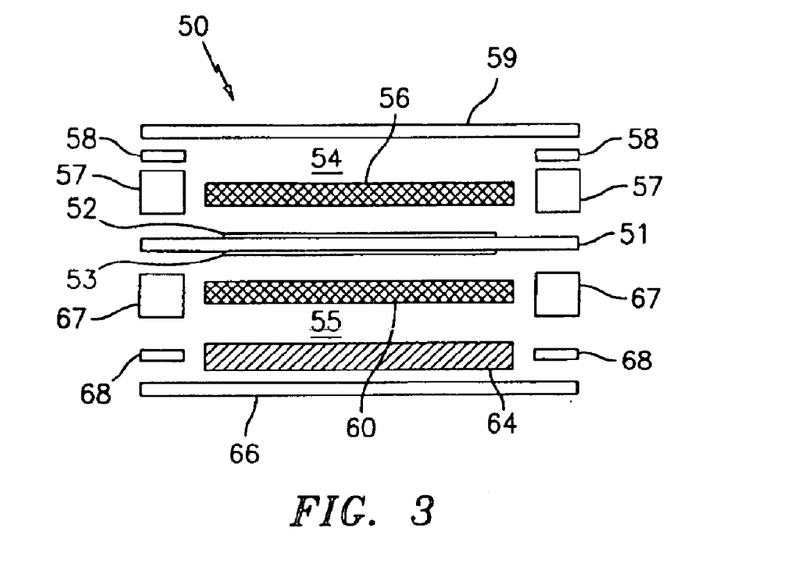
FIG. 3 is a cross sectional schematic representation of an electrochemical cell system showing the spatial relationship of the cell components and a pressure pad.

Referring to FIG. 3, an electrochemical cell system incorporating an exemplary embodiment of a pressure pad capable of providing improved compression in the active area of the cell is shown at 50. Cell system 50 typically includes a plurality of cells employed in a cell stack as part of the system. When cell system 50 is utilized as an electrolysis cell, power inputs are generally between about 1.48 volts and about 3.0 volts, with current densities being between about 50 A/ft$^2$ (amperes per square foot) and about 4,000 A/ft$^2$. When utilized as a fuel cell, power outputs range between about 0.4 volts and about 1 volt, with current densities being between about 0.1 A/ft$^2$ and about 10,000 A/ft$^2$. Current densities exceeding 10,000 A/ft$^2$ may also be obtained depending upon the fuel cell dimensions and configuration. The number of cells within the stack and the dimensions of the individual cells is scalable to the cell power output and/or gas output requirements.

Cell system 50 is substantially similar to cell system 30 as described above and shown with reference to FIG. 2. In particular, cell system 50 comprises an MEA defined by a proton exchange membrane 51 having a first electrode (e.g., an anode) 52 and a second electrode (e.g., a cathode) 53 disposed on opposing sides thereof. Regions proximate to and bounded on at least one side by anode 52 and cathode 53 respectively define flow fields 54, 55. A flow field support member 56 may be disposed adjacent to anode 52 and retained within flow field 54 by a frame 57 and a cell separator plate 59. A gasket 58 is optionally positioned between frame 57 and cell separator plate 59 to effectively seal flow field 54.

A flow field support member 60 may be disposed adjacent to cathode 53. A pressure pad 64 is typically disposed between flow field support member 60 and a cell separator plate 66. Flow field support member 60 and pressure pad 64 are retained within flow field 55 by a frame 67 and cell separator plate 66. Because pressure pad 64 may be fabricated from materials that are compatible with the cell environment, cell system 50 is generally operated without a pressure pad separator plate. A gasket 68 is optionally positioned between frame 67 and cell separator plate 66 to effectively seal flow field 55. The cell components, particularly frames 57, 67, cell separator plates 59, 66, and gaskets 58, 68, are formed with the suitable manifolds or other conduits to facilitate fluid communication through cell system 50.

Frames 57, 67 can be formed of any dielectric material that is compatible with the electrochemical cell environment and is capable of holding flow field support members 56, 60 in position within flow fields 54, 55. Materials from which frames 57, 67 can be fabricated include, but are not limited to, thermosets, thermoplastics, and rubber-based materials, such as polyetherimide, polysulfone, polyethersulfone, polyarylether ketone (PEEK), and mixtures comprising at least one of the foregoing materials.

Membrane 51 comprises electrolytes that are preferably solids or gels under the operating conditions of the electrochemical cell. Useful materials from which membrane 51 can be fabricated include proton conducting ionomers and ion exchange resins. Useful proton conducting ionomers include complexes comprising an alkali metal salt, an alkali earth metal salt, a protonic acid, or a protonic acid salt. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment.

Useful polyethers include polyoxyalkylenes, such as polyethylene glycol, polyethylene glycol monoether, and polyethylene glycol diether; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid, are known in the art to exhibit sufficient ionic conductivity to be useful.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins can include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases. One family of fluorocarbon-type resins having sulfonic acid group functionality is NAFION™ resins (commercially available from E. I. du Pont de Nemours and Company, Wilmington, Del.).

Anode 52 and cathode 53 are fabricated from catalyst materials suitable for performing the needed electrochemical reaction (i.e., electrolyzing water to produce hydrogen and oxygen). Suitable materials for anode 52 and cathode 53 include, but are not limited to, platinum, palladium, rhodium, carbon, gold, tantalum, tungsten, ruthenium, iridium, osmium, alloys thereof, and the like. Anode 52 and cathode 53 may be adhesively disposed on membrane 51, or they may be positioned adjacent to, but in contact with, membrane 51.

Flow field support members 56, 60 allow the passage of system fluids and are preferably electrically conductive. Such support members 56, 60 may comprise, for example, screen packs or bipolar plates. Screen packs include one or more layers of perforated sheets or a woven mesh formed from metal strands. Typical metals that may be used to fabricate screen packs include, for example, niobium, zirconium, tantalum, titanium, carbon steel, stainless steel, nickel, cobalt, and alloys thereof. Bipolar plates are commonly carbon or carbon composite structures incorporating a polymeric binder. Bipolar plates may also be fabricated from metal. Typical metals that may be used to fabricate bipolar plates include, but are not limited to, niobium, zirconium, tantalum, titanium, carbon steel, stainless steel, nickel, cobalt, and alloys thereof.

Electrical communication is maintained between adjacently positioned cells in the electrochemical system (and across the cell stack) through the cell separator plates. In order to facilitate the electrical communication, continuity of structure is provided between an anode and a cathode and its respective associated cell separator plate through a compression of the cell componentry. Such compression is effected in cell system 50 via pressure pad 64, which is disposed in direct contact with a flow field and is positioned adjacent to the cell separator plate on either the anode or the cathode side of membrane 51. To effect an optimum compression (and optimum electrical communication), pressure pads 64 may be disposed on both sides of membrane 51, and they may be positioned within either or both of the flow fields of cell system 50 in place of either or both of the flow field support members.

Pressure pad 64 comprises an electrically conductive material configured to provide for the electrical communication across the cell. Pressure pad 64 further comprises a compression member, which may be fabricated from an elastomeric material, to provide for the substantially uniform distribution of compression within the cell system. Both the electrically conductive material and the elastomeric material are preferably compatible with the system fluids and the material from which membrane 51 is fabricated. Pressure pad 64 is optionally porous to allow passage of water or system gases, is capable of allowing intimate contact to be maintained between cell components at high pressures, and is configured to withstand high pressures while maintaining its operability over extended time periods. In particular, pressure pad 64 is configured to withstand pressures up to or exceeding about 100 pounds per square inch (psi), about 500 psi, about 1000 psi, about 5000 psi, and more preferably about 10,000 psi. Pressure pad 64 may be configured and dimensioned to withstand pressures exceeding 10,000 psi.

It should be appreciated by those of skill in the art that electrically conductive components, e.g., rings, members, conductive plates, and other devices as are described herein, are fabricated from an electrically conductive material, and preferably an electrically conductive material that is compatible with the cell system fluids. Metallic materials from which electrically conductive components can be fabricated include, but are not limited to, conductive metals and alloys and superalloys thereof, for example copper, silver, gold, aluminum, zirconium, tantalum, titanium, niobium, iron and ferrous alloys, for examples steels such as stainless steel, nickel and nickel alloys such as HASTELLOY™ (commercially available from Haynes International, Kokomo, Ind.), cobalt and cobalt superalloys such as ELGILOY™ (commercially available from Elgiloy® Limited Partnership, Elgin, Ill.) and MP35N™ (commercially available from Maryland Specialty Wire, Inc., Rye, N.Y.), hafnium, and tungsten, among others, with titanium preferred because of its strength, durability, availability, low cost, ductility, low density, and its compatibility with the electrochemical cell environment. Non-metallic materials from which electrically conductive components can be fabricated include, but are not limited to, refractory materials, electrically conductive carbon, electrically conductive polymers, and electrically conductive graphite. Additionally, an electrically conductive component can comprise a substrate plated with a suitable metallic material. A substrate material can be plated by any suitable means (e.g., electroplating, chemical vapor deposition, etc.) with any of the foregoing metallic materials.

Compressible components, e.g., rings, members, and other devices as are described herein are fabricated from a compressible material such as an elastomeric material. Examples of such elastomeric materials include, but are not limited to silicones, such as fluorosilicones, fluoroelastomers, such as KALREZ® (commercially available from E. I. du Pont de Nemours and Company, Wilmington, Del.), VITON® (commercially available from E. I. du Pont de Nemours and Company, Wilmington, Del.), and FLUOREL® (commercially available from Minnesota Mining and Manufacturing Company, St. Paul, Minn.), and combinations and mixtures comprising at least one of the foregoing elastomeric materials. The elastomeric material is preferably inert to the electrochemical cell environment such that the pressure pad may be employed in fluid communication with the cell fluids and the cell membrane. Examples of such inert elastomeric materials include, but are not limited to fluoroelastomers, such as KALREZ®, VITON®, and FLUOREL®.

The elastomeric materials may themselves be made conductive, typically by the incorporation of electrically conductive particulate materials as is known in the art. Suitable electrically conductive particulate materials include, but are not limited to, the above-mentioned electrically conductive metals and alloys and superalloys thereof, preferably copper and nickel. Also useful are non-conductive particles coated with conductive materials, for example silver-coated glass spheres, as well as conductive, particulate carbon, for example acetylene blacks, conductive furnace black, super-conductive furnace black, extra-conductive furnace black, vapor grown carbon fibers, carbon nanotubes, and the like. Copper, nickel, conductive carbon, or a combination thereof is presently preferred because of their conductivity, availability, low cost, and compatibility with the electrochemical cell environment. The particular shape of the particles is not critical, and includes spheres, plates, whiskers, tubes, drawn wires, flakes, short fibers, irregularly-shaped particles, and the like. Suitable particle sizes and amounts vary widely, and are readily determined by one of ordinary skill in the art depending on factors including, but not limited to, the particular materials chosen, the desired elastomeric characteristics and conductivity of the pressure pad, the cost of the materials, the size of the pressure pad, the method of manufacture, and other considerations. Regardless of the exact size, shape, and composition of the conductive fillers particles, they should be thoroughly dispersed through the polymeric resin. Such compositions and their method of manufacture have been described, for example, in U.S. Pat. Nos. 4,011,360; 5,082,596; 5,296,570; 5,498,644; 5,585,038; and 5,656,690.

Figure 4:
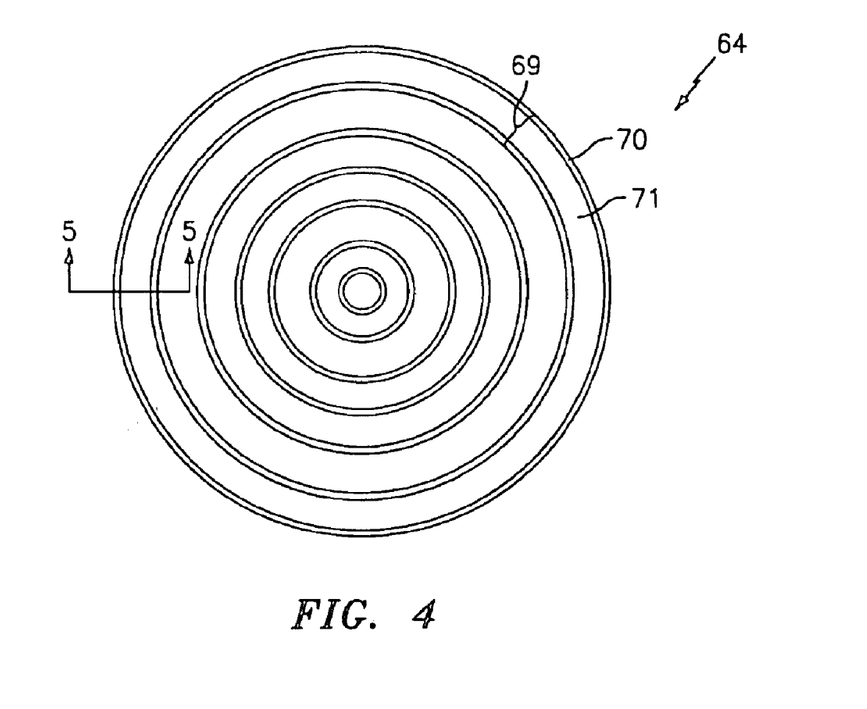
FIG. 4 is a plan view of a pressure pad having a plurality of concentrically arranged ring assemblies.

Referring now to FIG. 4, an exemplary embodiment of pressure pad 64 is shown. Pressure pad 64 comprises a plurality of concentrically arranged ring assemblies 69. In its simplest form, each ring assembly 69 is defined by an electrically conductive ring 70 and a compression ring 71 positioned adjacent to conductive ring 70. Rings 70, 71 may be continuous, or they may be broken to facilitate assembly of each ring assembly 69. Other configurations of the ring assembly (not shown) may be defined by at least two conductive rings and/or at least two compression rings. Ring assemblies 69 may be configured such that rings 70, 71 interengage, each ring being supported by an adjacently positioned ring.

Ring assembly 69 may be mounted or otherwise supported within the cell system structure by a support device (not shown) such as a plate or an arrangement of spacers. The size and geometry of pressure pad 64 is based upon the size and geometry of the cell into which pressure pad 64 is incorporated and the pressure range over which the cell operates. While pressure pad 64 is depicted in FIG. 4 as being round across a major plane thereof, it should be understood by those of skill in the art that pressure pad 64 may be configured as being elliptical or polygonal as dictated by the geometry of the cell. Fluid communication can be maintained across pressure pad 64 by configuring ring assemblies 69 to include openings, channels, or other fluid flow conduits (not shown).

Figure 5:
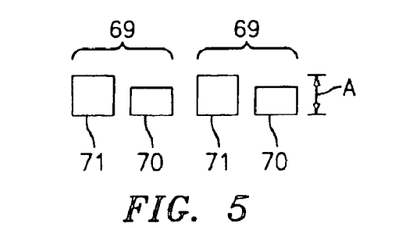
FIGS. 5 and 6 are schematic representations of a ring assembly of a pressure pad.
Figure 6:
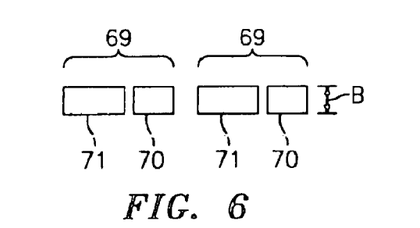
Figure 7:
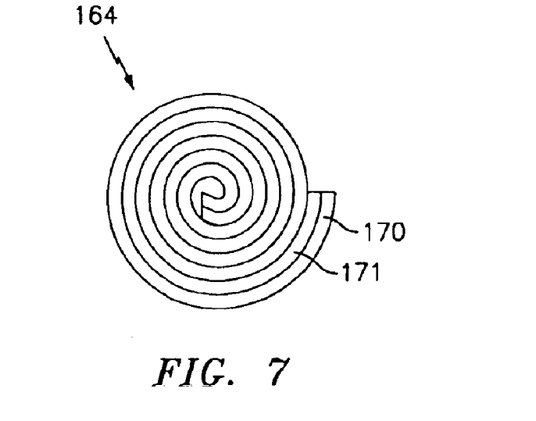
FIG. 7 is a plan view of a pressure pad having a spirally wound configuration.

Referring to FIGS. 5 and 6, the compression and decompression of ring assembly 69 is shown. In FIG. 5, a pressure pad into which ring assembly 69 is incorporated is not subject to a pressure. For pressure loads up to about 4000 psi, compression ring 71 has an uncompressed thickness A of between about 0.05 inches and about 1.5 inches (about 1.27 mm and about 38.1 mm). Upon compression of compression ring 71, as is illustrated in FIG. 6, compression ring 71 has a compressed thickness B that is less than uncompressed thickness A. Compression of compression ring 71 allows the pressure pad to be securely retained within the flow field of the electrochemical cell system. The dimensions of the pressure pad (including, but not limited to, thicknesses A and B) are defined such that a spring rate of the pressure pad is within a predetermined range. Moreover, while the cross sectional geometry of each ring 70, 71 is shown to be rectangular, it should be understood that rings 70, 71 may be of other cross sectional geometries, as is shown and described below with reference to FIGS. 10A through 10H Referring now to FIG. 7, an exemplary embodiment of a pressure pad is shown at 164. Pressure pad 164 comprises an electrically conductive member 170 and a compression member 171 positioned adjacent to conductive member 170. Members 170, 171 are wound in a spiral configuration and can be wound loosely or tightly to provide for varying degrees of fluid communication between opposing sides of pressure pad 164. Furthermore, pressure pad 164 can be positioned adjacent other similarly or differently configured pressure pads to provide support to the MEA of the electrochemical cell system. Variations in the tension with which the members of adjacently positioned pressure pads are wound can provide a porosity gradient across an assembly of adjacently positioned pressure pads, thereby allowing for the controlled flow of fluid through the cell system. The thickness of compression member 171, as above, is typically greater than the thickness of conductive member 170 to enable pressure pad 164 to be securely retained in the cell system.

Figure 8:
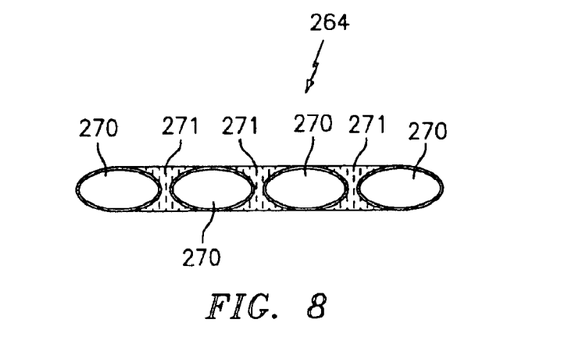
FIG. 8 is a sectional view of a pressure pad having an electrically conductive member and a compression member of complementary configuration.

With reference to FIG. 8, another exemplary embodiment of a pressure pad is shown at 264. Pressure pad 264 comprises a plurality of electrically conductive rings 270 of a particular cross sectional geometry between which are disposed compression rings 271 of a complementary cross sectional geometry. Compression of pressure pad 264 into which rings 270, 271 are incorporated enables contact to be maintained between mating surfaces thereof, thereby providing for a substantially uniform distribution of radial compression within pressure pad 264. Furthermore, although pressure pad 264 is described as being a plurality of rings, it should be understood by those of skill in the art that pressure pad 264 may comprise adjacently positioned individual members having complementary surfaces wound in a spiral pattern.

Figure 9A:
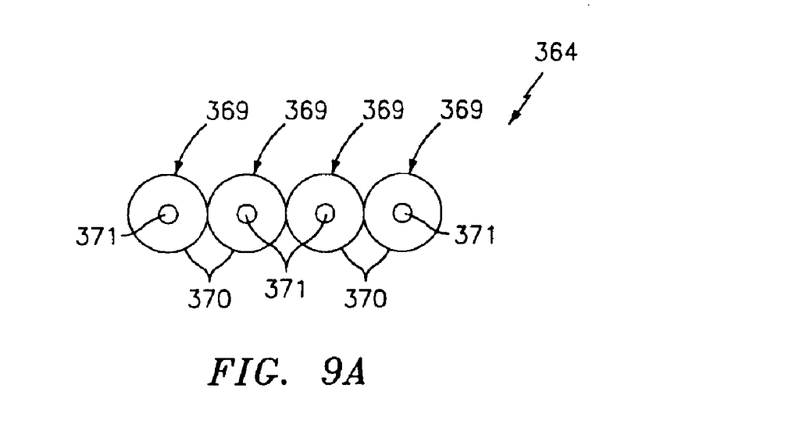
FIGS. 9A and 9B are sectional views of pressure pads having compression members longitudinally disposed within electrically conductive members.
Figure 9B:
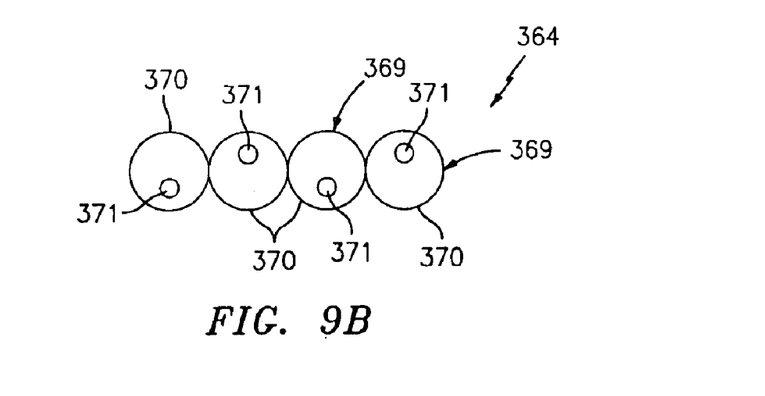

Another exemplary embodiment of a pressure pad is shown generally at 364 in FIGS. 9A and 9B. Pressure pad 364 comprises a plurality of rings 369 concentrically arranged, each ring 369 being defined by an electrically conductive member 370 and a compression member 371 integrally disposed with each other. Such an arrangement provides for substantially even compression within an electrochemical cell system, particularly under the high pressures at which cell systems typically operate.

Compression member 371 is longitudinally disposed within electrically conductive member 370 in an annular arrangement. Although compression member 371 can be disposed longitudinally anywhere within the boundaries of conductive member 370, as is shown in FIG. 9B, it should be appreciated by those of skill in the art that compression member 371 is preferably concentrically disposed within electrically conductive member 370, as is shown in FIG. 9A, such that compression member 371 is surrounded by an electrically conductive surface of substantially uniform thickness. Rings 369 are configured to have a geometry across a major plane thereof that corresponds with the cross sectional geometry of the cell stack into which they are incorporated. In particular, rings 369 may be round, elliptical, or polygonal. Moreover, while the cross sectional geometry of each member 370, 371 is shown to be round, it should be understood that the cross sectional geometries of the conductive and compression members may be of other shapes, e.g., shapes as depicted below with reference to FIGS. 10A through 10H. Similar to the rings of pressure pads described above, each ring 369 has an uncompressed thickness of between about 0.05 inches and about 1.5 inches (about 1.27 mm and about 38.1 mm).

Pressure pad 364 may also be defined by a continuous resilient cord spirally arranged. The spiral configuration is typically effected by winding the resilient cord around a central axial point. In such a configuration, compression member 371 is longitudinally disposed within electrically conductive member 370 to form the resilient cord, which, in a manner similar to that of the rings of pressure pad 364, incorporates both electrically conductive member 370 and compression member 371 in an annular arrangement that may or may not be concentric. As above, the cross sectional shapes of both the electrically conductive member and the compression member may be of various geometries. Similar to the rings, the resilient cord has an uncompressed thickness of between about 0.05 inches and about 1.5 inches (about 1.27 mm and about 38.1 mm).

The annular arrangement of the electrically conductive member and the compression member can be formed by a number of different operations. In one exemplary forming operation of pressure pads having either a ring or a spiral wound cord configuration, the compression member is wrapped (e.g., wound or braided over) or coated (e.g., through a dipping, spraying, or pultrusion process) with the electrically conductive member. In another exemplary forming operation, the conductive member can be chemically welded or adhesively bonded to the compression member. In yet another exemplary forming operation, the compression member, and particularly the outer surface of the compression member, can be impregnated with electrically conductive powders, fibers, or other elements to form the electrically conductive member.

Figure 10A:
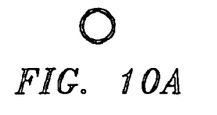
FIGS. 10A through 10H illustrate various cross sectional geometries of electrically conductive members and compression members.
Figure 10B:
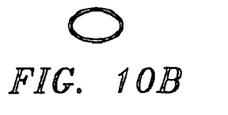
Figure 10C:
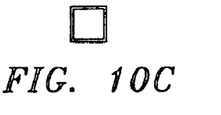
Figure 10D:
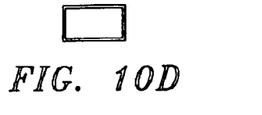
Figure 10E:
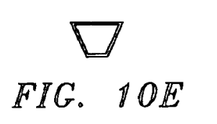
Figure 10F:
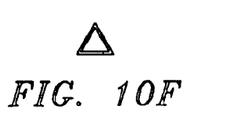
Figure 10G:
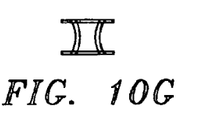
Figure 10H:
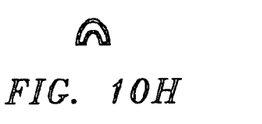

Referring to FIGS. 10A through 10H, the various cross sectional geometries of the electrically conductive or compression members employable in pressure pads are illustrated. In particular, it should be noted that structures defined by the geometries as depicted in FIGS. 10A and 10B can be employed with a structure having a geometry such as that depicted in FIG. 10G to provide a pressure pad structure (as is shown in FIG. 8) in which adjacently positioned components are supported in a complementary fashion. Furthermore, structures having geometries such as those shown in FIGS. 10C and 10D can provide complementary support, as can structures having geometries shown in FIGS. 10E and 10F. Rings or a spirally wound member having a geometry as is illustrated in FIG. 10H may be employed by itself or in conjunction with any of the others shown in FIGS. 10A through 10G.

Yet another exemplary embodiment of a pressure pad is shown at 464 with reference to FIGS. 11 through 14. Pressure pad 464 comprises an electrically conductive plate 470 having raised portions formed or otherwise disposed annularly (and preferably concentrically) over a major surface thereof and compression members disposed between the raised portions. Conductive plate 470 is generally formed in a stamping, casting, molding, or machining operation. The raised portions on major surface 469a of conductive plate 470 define alternating "peaks" and "troughs" that alternate and correspond with opposing troughs and peaks on an opposing major surface 469b of conductive plate 470. The alternating peaks and troughs define annularly positioned areas in which the compression members can be received to provide compressibility to pressure pad 464. The annularly positioned areas define a first receiving area 485a, a second receiving area 485b, and a third receiving area 485c on one major surface 469a of conductive plate 470, while correspondingly defining a fourth receiving area 485d and a fifth receiving area 485e on major surface 469b of conductive plate 470. It should be realized by those of skill in the art, however, that although conductive plate 470 is shown and described as having five receiving areas, any number of receiving areas can be disposed thereon. Compression members 471a, 471b, 471c, 471d, 471e are accordingly disposed within their respective receiving areas on the appropriate sides of conductive plate 470.

Figure 11:
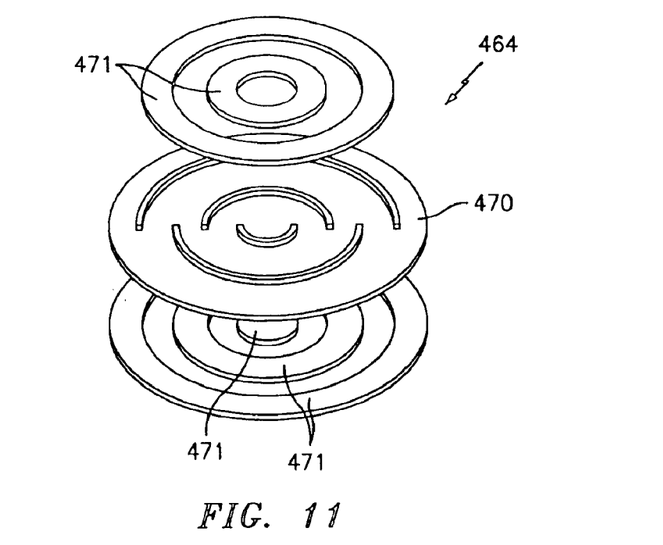
FIG. 11 is an exploded perspective view of a pressure pad configured as an electrically conductive plate on which compression members are disposed.
Figure 12:
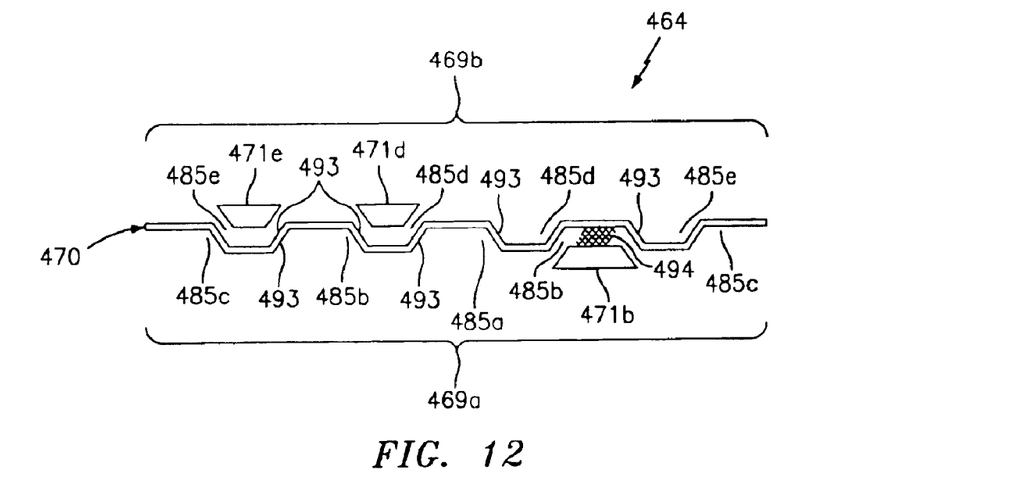
FIG. 12 is an edge sectional view of the electrically conductive plate of the pressure pad of FIG. 11.
Figure 13:
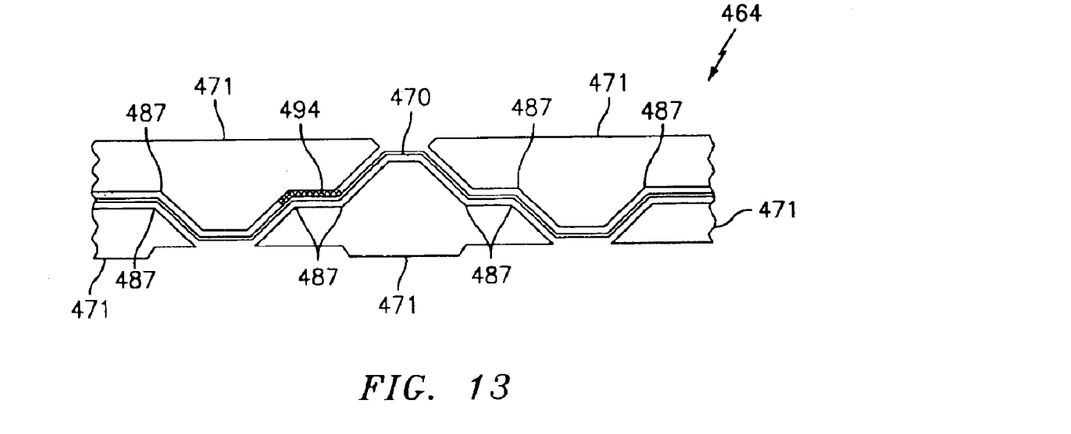
FIG. 13 is an edge sectional view of a pressure pad having a contoured plate.

As can be seen in FIGS. 11 and 12, transition surfaces 493 defining the raised portions and defining the receiving areas may be angled from the general plane of conductive plate 470. Transition surfaces 493 generally extend between major surfaces 469a, 469b at angles greater than ninety degrees. Transition surfaces 493 may also be configured such that a plurality of edges 487 are defined thereon, as is shown in the exemplary embodiment illustrated in FIG. 13. In either configuration, the compression members disposed therein may include an adhesive material 494 disposed between the surfaces thereof and the surfaces of the respective receiving areas to facilitate the retention of compression members 471 within the receiving areas.

Alternately, or additionally, compression members 471 may include an adhesive material integral therewith to provide bondability with the surfaces of conductive plate 470.

Figure 14:
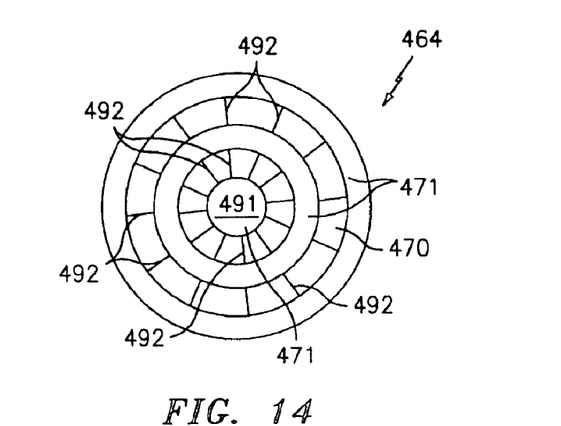
FIG. 14 is a plan view of the pressure pad of FIG. 11.

Referring now to FIG. 14, conductive plate 470 may include a plurality of interruptions 492 extending radially from a center location 491 of conductive plate 470 to define an arrangement of wedges joined at the center location. Interruptions 492 impart a flexibility to conductive plate 470 by allowing the wedges to independently respond to variations in pressure exerted on the face of conductive plate 470. Such a flexibility substantially reduces the rigidity of conductive plate 470 and enables pressure pad 464 to provide for the even distribution of compression within the cell system while maintaining electrical communication across the opposing faces of conductive plate 470.

Figure 15:
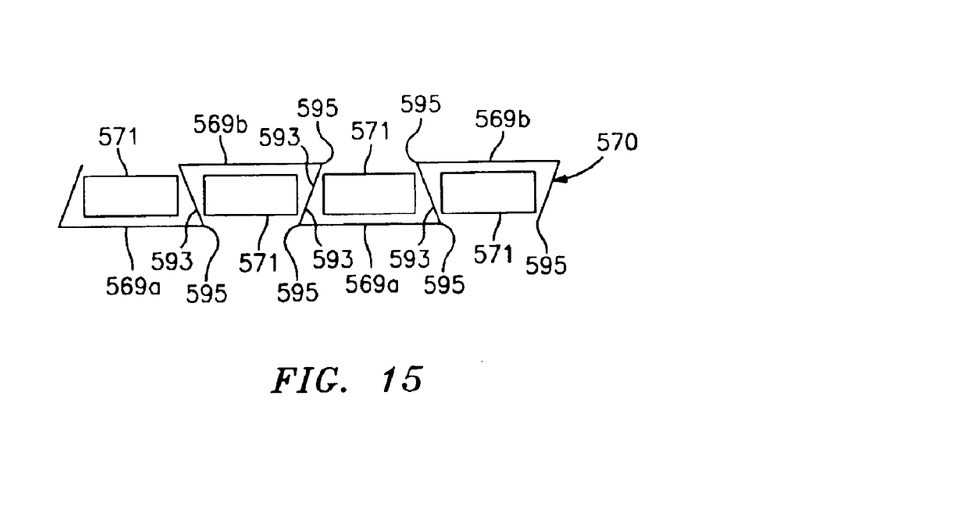
FIG. 15 is an edge sectional view of a pressure pad having a plate configured to capture compression members therein.

In another exemplary embodiment of a conductive plate shown at 570 with reference to FIG. 15, the edges defined by transition surfaces 593 are such that the angles between the major surfaces are less than ninety degrees. In such a configuration, compression members 571 disposed within the receiving areas are physically retained or captured therein by edges 595 formed by the major surfaces 569*a*, 569*b* and transition surfaces 593. Adhesive materials may optionally be employed to assist in the retention of compression members 571 within the receiving areas.

Figure 16:
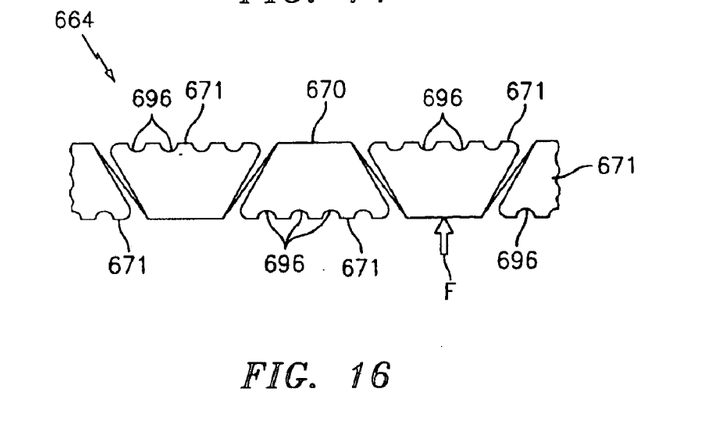
FIG. 16 is an edge sectional view of a pressure pad having compression members into which trans-radial grooves are disposed.

An exemplary embodiment of a compression member 671 employable in a pressure pad 664 includes grooves 696 disposed therein, as is shown in FIG. 16. Grooves 696 typically extend trans-radially across at least one surface of each compression member 671. Upon compression of a plate 670 into which a grooved compression member 671 is mounted, the pressure exerted normally on the major surface of plate 670 facilitates the radially outward dispersion of a compressive force F applied to pressure pad 664 through compression member 671. Dispersion of such pressure further facilitates the compression of compression member 671 against an adjacent surface, e.g., a frame of the cell system.

Figure 17:
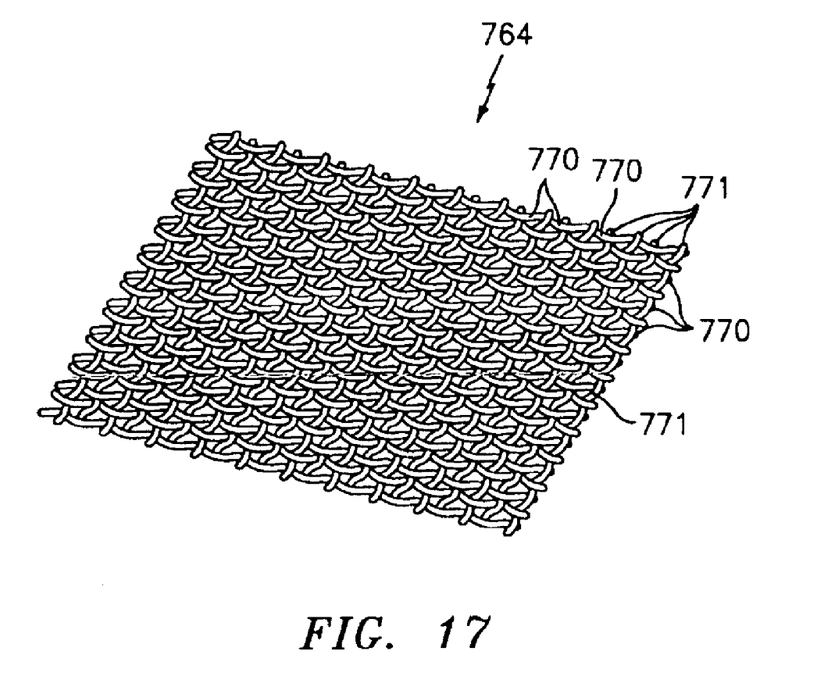
FIG. 17 is a perspective view of a pressure pad wherein electrically conductive and elastomeric members are woven together.
Figure 18:
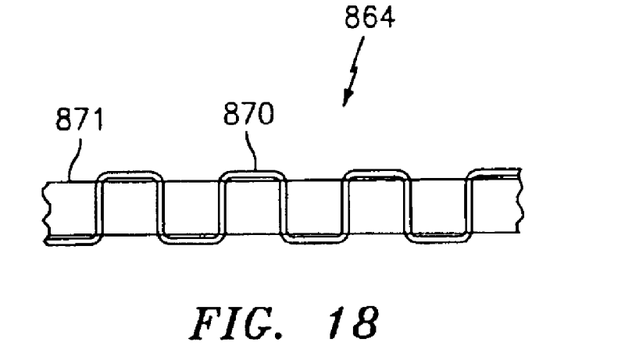
FIG. 18 is a side sectional view of a pressure pad in which an electrically conductive member is stitched into an elastomeric member.

In other exemplary embodiments of the pressure pad, an electrically conductive material and an elastomeric material are integrated with each other by inter-weaving strands of the electrically conductive and elastomeric materials (as is shown in FIG. 17) or by stitching strands of one material into the other (as is shown in FIG. 18). Additionally, the pressure pad can comprise a plurality of woven or stitched layers where the faces of each individual pressure pad can be disposed adjacent to each other. The individual pressure pads can be interconnected to form a unitary pad, or they can be stacked and held in place within the cell by the frames and the cell separator plates.

For configurations in which the pressure pad is woven, as is shown at 764 in FIG. 17, electrically conductive material 770 is generally provided as a cord or ribbon (i.e., a flattened cord). The thickness of electrically conductive material 770 is typically between about 0.005 inches and about 0.1 inches (about 0.127 mm and about 2.54 mm) and preferably between about 0.005 inches and about 0.01 inches (about 0.127 mm and about 0.254 mm). Elastomeric material 771 may similarly be provided in a cord or ribbon form having a diameter or other cross-sectional dimension that is substantially less than the length. The cross-sectional shape of electrically conductive material 770 or elastomeric material 771 can be circular, oval, square, rectangular, triangular, polygonal, or any other shape suited to weaving. One exemplary suitable elastomeric material 771 has a circular cross-section, for example, with a diameter from about 0.05 inches to about 0.1 inches (about 1.27 mm to about 2.54 mm), and preferably from about 0.075 inches to about 0.1 inches (about 1.9 mm to about 2.54 mm).

Referring now to FIG. 18, an exemplary embodiment of a stitched pressure pad is shown at 864. In pressure pad 864, a first material (e.g., an electrically conductive material 870) is stitched into a second material (e.g., an elastomeric material 871), wherein the second material is provided in the form of a flat sheet. The flat sheet includes perforations provided therein to facilitate the stitching operation. Either electrically conductive material 870 or elastomeric material 871 may be stitched into the other, for example, flat layers of a perforated conductive metal or a felt of conductive carbon fibers may be stitched into a flat layer of an elastomer such as a fluorosilicone; or flat layers of an elastomer such as fluorosilicone may be stitched into a layer of metal. In one exemplary embodiment of pressure pad 864, the elastomeric material is a polytetrafluoroethylene, such as VITON®, in the form of a perforated pad having a durometer from about 45 to about 90 and preferably from about 70 to about 75. An electrically conductive ribbon of titanium is stitched through the polytetrafluoroethylene. Alternately, VITON® in the form of a cord may be woven through a sheet of electrically conductive carbon fibers.

In any of the foregoing exemplary embodiments, the pressure pads are typically disposed at the side of the cell at which the pressure is greater. It should be understood by those of skill in the art, however, that pressure pads may be disposed at either side or at both sides of the cell. Furthermore, it should be understood that a suitable number of pressure pads can be stacked to replace either or both of the flow field support members in the cell system.

The electrochemical cell system as described above incorporates pressure pads preferably formed of metals and elastomeric materials that are compatible with the cell system fluids as well as the cell membrane. The pressure pads are capable of withstanding pressures of up to or in excess of 100 psi, 500 psi, 1000 psi, 5000 psi, and, more preferably, up to or in excess of 10,000 psi, with the upper limit being a function of the cell system capabilities. The electrically conductive material and the elastomeric material is generally selected and the pressure pad configured such that the overall electrical resistance of the cell system is minimal, thereby resulting in an overall stack resistance that is minimal.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An electrochemical cell, comprising:
    a first electrode;
    a second electrode;
    a membrane disposed between the first electrode and the second electrode; and a pressure pad disposed in electrical communication with the first electrode and being configured to support the first electrode, the second electrode, and the membrane, the pressure pad comprising,
 an electrically conductive member, and
 a compression member disposed at the electrically conductive member;
 wherein the electrically conductive member and the compression member are spirally arranged to form the pressure pad.

2. The electrochemical cell of claim 1 wherein the electrically conductive member and the compression member are continuous structures concentrically arranged to form the pressure pad.

3. An electrochemical cell, comprising:
 a first electrode:
 a second electrode;
 a membrane disposed between the first electrode and the second electrode: and
 a pressure pad disposed in electrical communication with the first electrode and being configured to support the first electrode, the second electrode, and the membrane, the pressure pad comprising:
 an electrical conductive member, and
 a compression member disposed at the electrically conductive member;
 wherein the electrically conductive member comprises a plate, the plate being configured to include plurality of raised portions concentrically disposed thereon, the raised portions being configured to receive compression members therebetween.

4. The electrochemical cell of claim 1 wherein the compression member is longitudinally disposed within the electrically conductive member.

5. The electrochemical cell of claim 1 wherein the electrically conductive member is compressible.

6. The electrochemical cell of claim 1 wherein the pressure pad is porous.

7. The electrochemical cell of claim 1 wherein the electrically conductive member comprises a material selected from the group consisting of copper, silver, gold, aluminum, niobium, zirconium, tantalum, titanium, iron, nickel, cobalt, hafnium, tungsten, alloys of the foregoing materials, superalloys of the foregoing materials, electrically conductive polymers, and combinations of the foregoing materials.

8. The electrochemical cell of claim 1 wherein the electrically conductive member is comprise electrically conductive carbon.

9. The electrochemical cell of claim 1 wherein the compression member comprises an elastomeric material.

10. The electrochemical cell of claim 9 wherein the elastomeric material is selected from the group consisting of silicones, fluorosilicones, fluoroelastomers, and combinations of the foregoing materials.

11. The electrochemical cell of claim 7 wherein the material is selected from the group consisting of gold, aluminum, niobium, zirconium, tantalum, titanium, iron, cobalt, hafnium, tungsten, alloys of the foregoing materials, superalloys of the foregoing materials, and combinations of the foregoing materials.

12. The electrochemical cell of claim 11 wherein the material is selected from the group consisting of niobium, tantalum, titanium, cobalt, hafnium, tungsten, alloys of the foregoing materials, superalloys of the foregoing materials, and combinations of the foregoing materials.

13. The electrochemical cell of claim 1 wherein the electrically conductive member comprises titanium.

14. The electrochemical cell of claim 1 wherein the electrically conductive member comprises a material selected from the group consisting of electrically conductive carbon, electrically conductive polymers, and electrically conductive graphite, alloys of the foregoing materials, superalloys of the foregoing materials, and combinations of the foregoing materials.

15. The electrochemical cell of claim 3 wherein the electrically conductive member is compressible.

16. The electrochemical cell of claim 3 wherein the pressure pad is porous.

17. The electrochemical cell of claim 3 wherein the electrically conductive member comprises a material selected from the group consisting of copper, silver, gold, aluminum, niobium, zirconium, tantalum, titanium, iron, nickel, cobalt, hafnium, tungsten, alloys of the foregoing materials, superalloys of the foregoing materials, electrically conductive polymers, and combinations of the foregoing materials.

18. The electrochemical cell of claim 17 wherein the material is selected from the group consisting of gold, aluminum, niobium, zirconium, tantalum, titanium, iron, cobalt, hafnium, tungsten, alloys of the foregoing materials, superalloys of the foregoing materials, and combinations of the foregoing materials.

19. The electrochemical cell of claim 18 wherein the material is selected from the group consisting of niobium, tantalum, titanium, cobalt, hafnium, tungsten, alloys of the foregoing materials. superalloys of the foregoing materials, and combinations of the foregoing materials.

20. The electrochemical cell of claim 3 wherein the electrically conductive member comprises titanium.

21. The electrochemical cell of claim 3 wherein the electrically conductive member comprises a material selected from the group consisting of electrically conductive carbon, electrically conductive polymers, and electrically conductive graphite, alloys of the foregoing materials, superalloys of the foregoing materials, and combinations of the foregoing materials.

22. The electrochemical cell of claim 3 wherein the electrically conductive member comprises electrically conductive carbon.

23. The electrochemical cell of claim 3 wherein the compression member comprises an elastomeric material.

24. The electrochemical cell of claim 23 wherein the elastomeric material is selected from the group consisting of silicones, fluorosilicones, fluoroelastomers, and combinations of the foregoing materials.

25. The electrochemical cell of claim 3 wherein the raised portions are concentrically disposed on a first major surface of the plate and on an opposing second major surface of the plate.

26. The electrochemical cell of claim 25 wherein the raised portions concentrically disposed on the first major surface of the plate register with spaces between the raised portions concentrically disposed on the second major surface of the plate.

27. The electrochemical cell of claim 25 wherein the plate includes an interruption extending radially outward from a hub disposed substantially at a center of the plate, the interruption being configured to provide a flexibility to the plate.

28. An electrochemical cell, comprising:
 a first electrode;
 a second electrode;
 a membrane disposed between the first electrode and the second electrode; and a pressure pad disposed in electrical communication with the first electrode and being configured to support the first electrode, the second electrode, and the membrane, the pressure pad comprising, an electrically conductive member, and a compression member disposed at the electrically conductive member;

wherein the electrically conductive member comprises a plate, the plate being configured to include plurality of raised portions annularly disposed thereon, the raised portions being configured to receive compression members therebetween.

29. The electrochemical cell of claim 28 wherein the electrically conductive member comprises electrically conductive carbon.

30. The electrochemical cell of claim 28 wherein the electrically conductive member is compressible.

31. The electrochemical cell of claim 28 wherein the pressure pad is porous.

32. The electrochemical cell of claim 28 wherein the electrically conductive member comprises a material selected from the group consisting of copper, silver, gold, aluminum, niobium, zirconium, tantalum, titanium, iron, nickel, cobalt, hafnium, tungsten, alloys of the foregoing materials, superalloys of the foregoing materials, electrically conductive polymers, and combinations of the foregoing materials.

33. The electrochemical cell of claim 32 wherein the material is selected from the group consisting of gold, aluminum, niobium, zirconium, tantalum, titanium, iron, cobalt, hafnium, tungsten, alloys of the foregoing materials, superalloys of the foregoing materials, and combinations of the foregoing materials.

34. The electrochemical cell of claim 33 wherein the material is selected from the group consisting of niobium, tantalum, titanium, cobalt, hafnium, tungsten, alloys of the foregoing materials, superalloys of the foregoing materials, and combinations of the foregoing materials.

35. The electrochemical cell of claim 28 wherein the electrically conductive member comprises titanium.

36. The electrochemical cell of claim 28 wherein the electrically conductive member comprises a material selected from the group consisting of electrically conductive carbon, electrically conductive polymers, and electrically conductive graphite, alloys of the foregoing materials, superalloys of the foregoing materials, and combinations of the foregoing materials.

37. The electrochemical cell of claim 28 wherein the compression member comprises an elastomeric material.

38. The electrochemical cell of claim 37 wherein the elastomeric material is selected from the group consisting of silicones, fluorosilicones, fluoroelastomers, and combinations of the foregoing materials.

* * * * *